United States Patent
Park

(10) Patent No.: US 12,079,900 B2
(45) Date of Patent: Sep. 3, 2024

(54) METHOD FOR MAKING MONTAGE BASED ON DIALOGUE AND APPARATUS USING THE SAME

(71) Applicant: ELECTRONICS AND TELECOMMUNICATIONS RESEARCH INSTITUTE, Daejeon (KR)

(72) Inventor: Won-Joo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 357 days.

(21) Appl. No.: 17/513,629

(22) Filed: Oct. 28, 2021

(65) Prior Publication Data

US 2022/0284635 A1 Sep. 8, 2022

(30) Foreign Application Priority Data

Mar. 2, 2021 (KR) ........................ 10-2021-0027517

(51) Int. Cl.
| | | |
|---|---|---|
| G06F 40/279 | (2020.01) | |
| G06N 3/045 | (2023.01) | |
| G06T 11/00 | (2006.01) | |
| G06V 10/94 | (2022.01) | |
| G06V 40/16 | (2022.01) | |

(52) U.S. Cl.
CPC ............ *G06T 11/00* (2013.01); *G06F 40/279* (2020.01); *G06N 3/045* (2023.01); *G06V 10/95* (2022.01); *G06V 40/171* (2022.01)

(58) Field of Classification Search
CPC ....................................................... G06T 11/00
See application file for complete search history.

(56) References Cited

U.S. PATENT DOCUMENTS

| | | | |
|---|---|---|---|
| 9,691,132 B2 | 6/2017 | Kim et al. | |
| 9,734,613 B2 | 8/2017 | Kim et al. | |
| 11,783,524 B2 * | 10/2023 | Vats ....................... | G06T 13/205 |
| | | | 345/473 |
| 2010/0021018 A1 | 1/2010 | Lee et al. | |
| 2012/0117051 A1 | 5/2012 | Liu | |
| 2014/0204089 A1 | 7/2014 | Lim et al. | |
| 2021/0056348 A1 * | 2/2021 | Berlin ...................... | G06T 11/60 |

(Continued)

FOREIGN PATENT DOCUMENTS

| | | |
|---|---|---|
| JP | 2009-140047 A | 6/2009 |
| JP | 2016053868 A | 4/2016 |
| KR | 1020130142121 A | 12/2013 |

(Continued)

OTHER PUBLICATIONS

A. Oh. "Speech2Face: Learning the Face behind a Voice" IEEE, May 23, 2019, (Year: 2019).*

(Continued)

*Primary Examiner* — Oneal R Mistry
(74) *Attorney, Agent, or Firm* — Rabin & Berdo, P.C.

(57) ABSTRACT

Disclosed herein are a method for making a montage based on a dialogue and an apparatus using the same. The method includes extracting a feature for making a montage based on the dialogue between at least one inquirer and at least one respondent, generating a facial feature image based on the feature, and making a montage based on the facial feature image.

14 Claims, 9 Drawing Sheets

(56) References Cited

U.S. PATENT DOCUMENTS

2021/0166461 A1* 6/2021 Riesen .................... G06T 1/60

FOREIGN PATENT DOCUMENTS

| KR | 10-2014-0040582 A | 4/2014 |
| KR | 10-1418878 B1 | 7/2014 |
| KR | 10-2016-0041570 A | 4/2016 |

OTHER PUBLICATIONS

Oh et al (NPL Speech2Face: Learning the Face Behind a Voice, MIT CSAIL, May 2019) (Year: 2019).*

Muhammad Zeeshan Khan et al., "A Realistic Image Generation of Face from Text Description using the Fully Trained Generative Adversarial Networks", IEEE Access (vol. 9), Aug. 10, 2020.

* cited by examiner

| FEATURE | FEATURE VALUE | EXAMPLE OF ADDITIONAL QUESTION |
|---|---|---|
| GENDER | MAN | MAN OR WOMAN? |
| AGE GROUP | TWENTIES | HOW OLD DID HE/SHE LOOK? |
| FACE SHAPE | OVAL SHAPE | WHICH SHAPE OF FACE DID HE/SHE HAVE? |
| HAIR STYLE | BROWN, PERMED | WHICH HAIR STYLE DID HE/SHE HAVE? |
| EYES | DOUBLE EYELIDS, BIG EYES | WHAT DID HIS/HER EYES LOOK LIKE? |
| NOSE | | WHAT DID HIS/HER NOSE LOOK LIKE? |
| MOUTH | | WHAT DID HIS/HER MOUTH LOOK LIKE? |
| EARS | | WHAT DID HIS/HER EARS LOOK LIKE? |
| ⋮ | ⋮ | ⋮ |

FIG. 5

METHOD FOR MAKING MONTAGE BASED ON DIALOGUE AND APPARATUS USING THE SAME

CROSS REFERENCE TO RELATED APPLICATION

This application claims the benefit of Korean Patent Application No. 10-2021-0027517, filed Mar. 2, 2021, which is hereby incorporated by reference in its entirety into this application.

BACKGROUND OF THE INVENTION

1. Technical Field

The present invention relates generally to technology for making a montage based on a dialogue, and more particularly to technology for automatically making a montage based on analysis of a dialogue between an inquirer and a respondent as a way of extending a method in which a montage is drawn by experts or in which a montage is made by combining features retrieved from a database.

2. Description of the Related Art

Currently, in order to make a montage of a missing person, a crime suspect, or the like, a method in which a montage is manually drawn by an expert based on descriptions by witnesses or victims or a method in which a montage is made by combining various kinds of feature data retrieved from a feature database is used.

However, these methods need professional specialists even for initial work for making a montage, and although montage software is used, such software has to be operated by skilled users. Therefore, when it is not easy to naturally collect information because witnesses or victims are nervous, it is very difficult to collect information required for making a montage.

DOCUMENTS OF RELATED ART (Patent Document 1) Korean Patent Application Publication No. 10-2014-0040582, published on Apr. 3, 2014 and titled "Method and apparatus for inferring montage".

SUMMARY OF THE INVENTION

An object of the present invention is to automatically make a montage by analyzing a natural dialogue between an inquirer who intends to make a montage and respondents, such as witnesses, victims, or the like.

Another object of the present invention is to recommend additional questions for making a montage to an inquirer so as to induce witnesses or victims to easily refresh their memories, thereby collecting a greater amount of information and more accurately making a desired montage based on the collected information.

A further object of the present invention is to provide a montage making environment in which multiple participants are able to interact with each other using shared resources, thereby enabling witnesses or victims to participate in making of a montage.

Yet another object of the present invention is to provide a montage making system that is capable of automatically recommending or adding new feature data, which is continuously required with internationalization and the diversification of society.

Still another object of the present invention is to make a montage using a method that is more generalized than a method in which a montage is made by professional specialists.

In order to accomplish the above objects, a method for making a montage based on a dialogue according to the present invention includes extracting a feature for making a montage based on a dialogue between at least one inquirer and at least one respondent; generating a facial feature image based on the feature; and making a montage based on the facial feature image.

Here, the method may further include determining whether there are missing features based on the dialogue; and generating an additional question for getting an additional feature when it is determined that there are missing features.

Here, the montage may be made by combining multiple facial feature images generated based on multiple features.

Here, the method may further include displaying the montage on a display shared between the at least one inquirer and the at least one respondent.

Here, extracting the feature may include extracting a keyword corresponding to the feature by analyzing an answer provided by the at least one respondent, corresponding to the purport of a question asked by the at least one inquirer, and taking the keyword as metadata.

Here, generating the facial feature image may include retrieving the facial feature image from a facial feature image database in consideration of metadata corresponding to the feature; and generating a new facial feature image corresponding to the feature when a facial feature image tagged with the metadata is not present in the facial feature image database.

Here, generating the new facial feature image may include generating the new facial feature image by applying a Generative Adversarial Network (GAN) to the facial feature image database.

Here, generating the new facial feature image may include tagging the new facial feature image with the metadata and storing the new facial feature image tagged with the metadata in the facial feature image database.

Here, the method may further include creating metadata by analyzing the characteristics of each of multiple 2D or 3D facial feature images; and configuring the facial feature image database by tagging each of the multiple facial feature images with metadata corresponding thereto.

Here, the feature may correspond to characteristic information of each of facial components constituting the montage.

Here, displaying the montage may include displaying at least one recommended montage as well as the montage.

Also, an apparatus for making a montage based on a dialogue according to an embodiment of the present invention includes a processor for extracting a feature for making a montage based on a dialogue between at least one inquirer and at least one respondent, generating a facial feature image based on the feature, and making a montage based on the facial feature image; and a facial feature image database for managing the facial feature image.

Here, the processor may determine whether there are missing features based on the dialogue, and may generate an additional question for getting an additional feature when it is determined that there are missing features.

Here, the montage may be made by combining multiple facial feature images generated based on multiple features.

Here, the processor may display the montage on a display shared between the at least one inquirer and the at least one respondent.

Here, the processor may extract a keyword corresponding to the feature by analyzing an answer provided by the at least one respondent, corresponding to the purport of a question asked by the at least one inquirer, and may take the keyword as metadata.

Here, the processor may retrieve the facial feature image from the facial feature image database in consideration of metadata corresponding to the feature, and when a facial feature image tagged with the metadata is not present in the facial feature image database, the processor may generate a new facial feature image corresponding to the feature.

Here, the processor may generate the new facial feature image by applying a Generative Adversarial Network (GAN) to the facial feature image database.

Here, the processor may tag the new facial feature image with the metadata and store the new facial feature image tagged with the metadata in the facial feature image database.

Here, the facial feature image database may be configured by tagging each of multiple 2D or 3D facial feature images with metadata created by analyzing the characteristics of the facial feature image.

Here, the feature may correspond to characteristic information of each of facial components constituting the montage.

Here, the processor may display at least one recommended montage as well as the montage.

BRIEF DESCRIPTION OF THE DRAWINGS

The above and other objects, features, and advantages of the present invention will be more clearly understood from the following detailed description taken in conjunction with the accompanying drawings, in which:

FIGS. 4 to 5 are views illustrating an example of the process of extracting features based on a dialogue according to the present invention;

DESCRIPTION OF THE PREFERRED EMBODIMENTS

Figure 1:
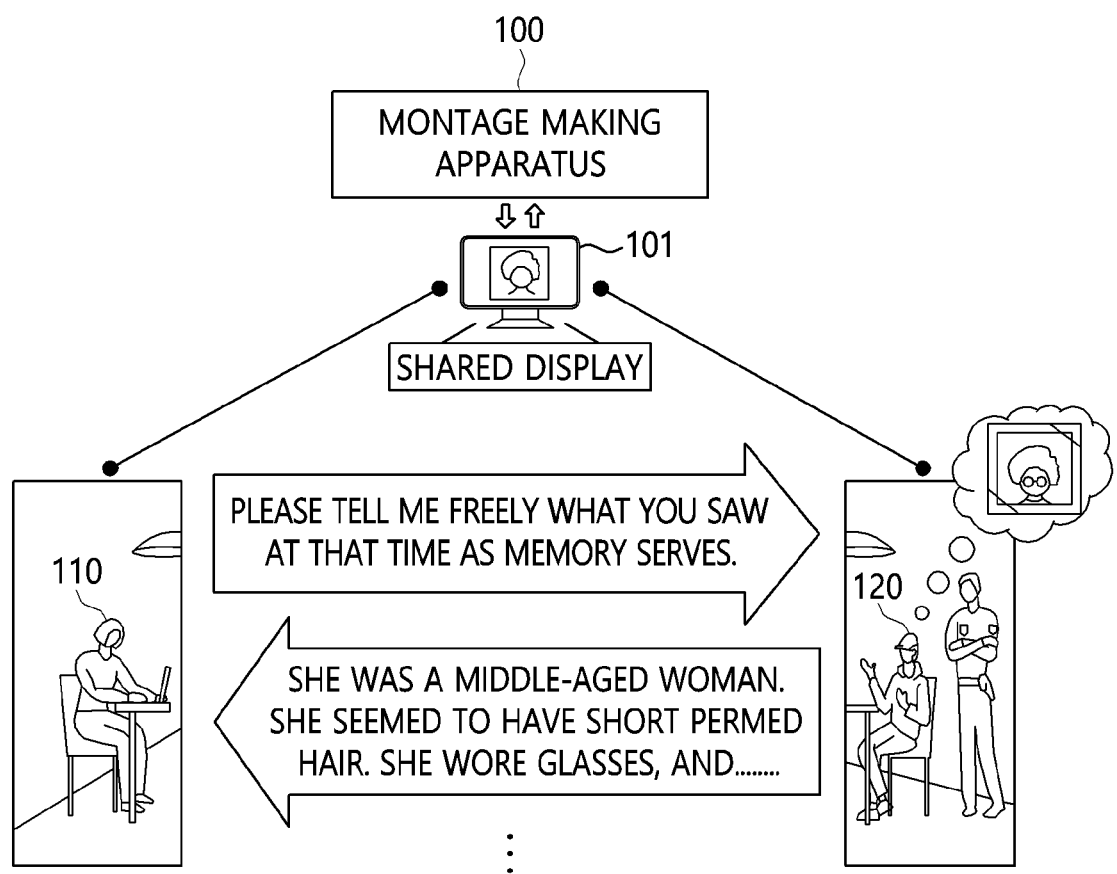
FIG. 1 is a view illustrating an example of making of a montage using a system for making a montage according to the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a view illustrating an example of making of a montage using a system for making a montage according to the present invention.

Referring to FIG. 1, the apparatus 100 for making a montage according to an embodiment of the present invention collects information required for making a montage when at least one inquirer 110 and at least one respondent 120 exchange information required for making of a montage in an atmosphere of freedom, thereby making a montage based thereon.

For example, the apparatus 100 for making a montage may collect information from the dialogue between the at least one inquirer 110 and the at least one respondent 120 with a focus on words, sentences, and the like determined to be required for making of a montage, and may retrieve facial feature images corresponding to the collected information from a facial feature image DB, which manages images related to montages. Then, a montage may be made by combining the retrieved facial feature images.

Here, the apparatus 100 for making a montage may display the made montage through a display 101 shared between the at least one inquirer 110 and the at least one respondent 120.

Here, the montage is displayed on the display 101, which is the space shared between the inquirer 110, who is in the position to make a montage, and the respondent 120, who is in the position to provide information required for making a montage, whereby a montage about which the participants agree with each other may be made.

Figure 2:
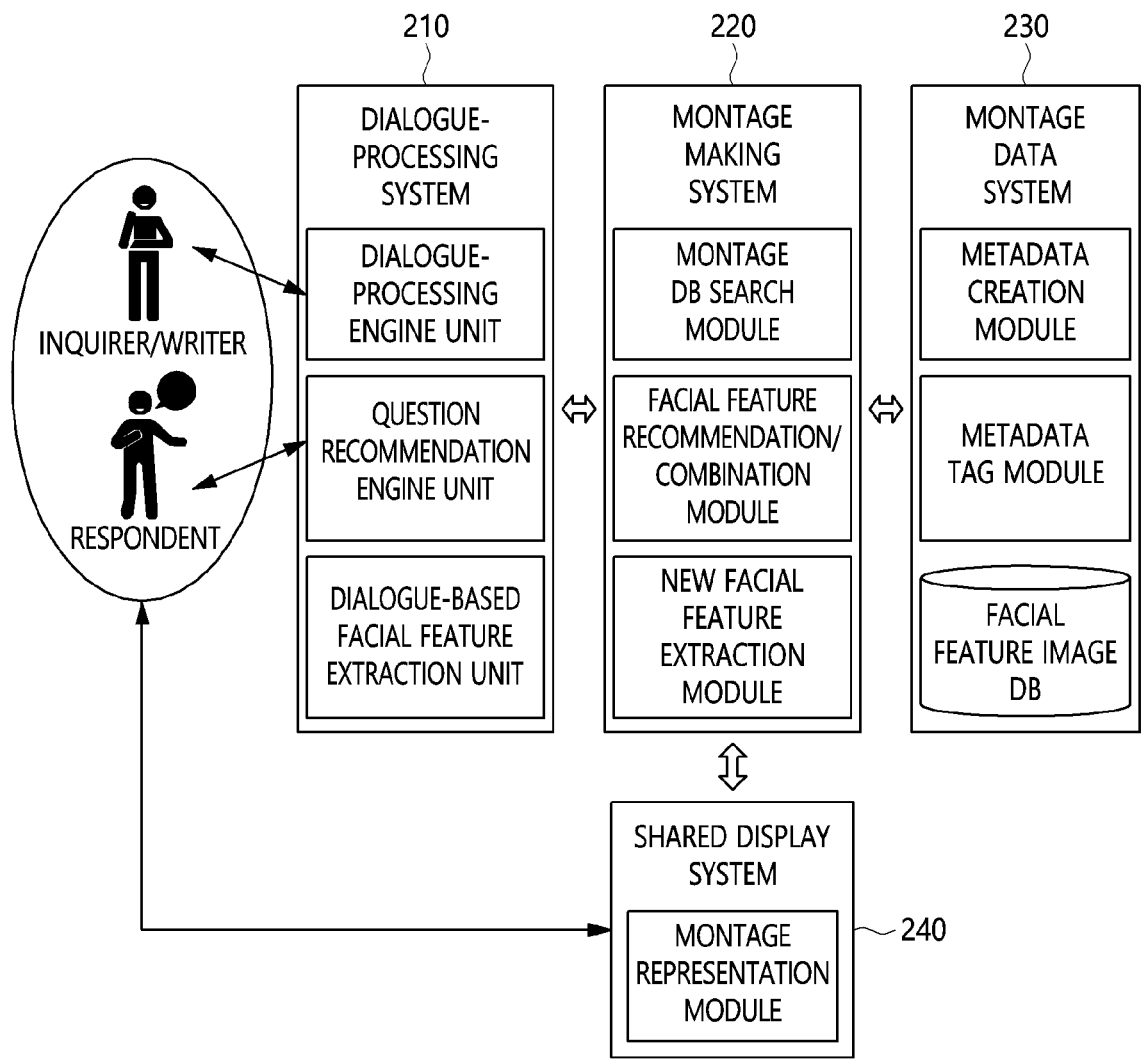
FIG. 2 is a view illustrating a system for making a montage according to an embodiment of the present invention.

FIG. 2 is a view illustrating a system for making a montage according to an embodiment of the present invention.

Referring to FIG. 2, the system for making a montage according to an embodiment of the present invention may be broken down into a dialogue-processing system 210, a montage making system 220, a montage data system 230, and a shared display system 240.

First, the dialogue-processing system 210 may serve to perform processing of the dialogue between at least one inquirer and at least one respondent.

When a dialogue between multiple participants including at least one inquirer and at least one respondent is held, the dialogue-processing system 210 may collect information required for making a montage from the dialogue.

Here, a dialogue-processing engine unit may understand the purport of a question asked by the at least one inquirer, and may recognize and process an answer provided by the at least one respondent.

Here, when it determines that there is a lack of information to make a montage, a question recommendation engine unit generates a question corresponding thereto and provides the same to the inquirer, thereby inducing the inquirer to ask the question.

Here, a dialog-based facial feature extraction unit may take features required for making a montage, among the information collected by the dialogue-processing engine unit, as metadata and deliver the same to the montage making system 220.

The montage making system 220 may serve to make a montage.

For example, when it receives the features required for making a montage from the dialogue-processing system 210, the montage making system 220 retrieves data from the montage data system 230 or newly gets suitable features and combines the same, thereby making a montage.

Here, a montage DB search module may search the montage data system 230 for facial feature images corresponding to the features received from the dialogue-processing system 210.

Here, a facial feature recommendation/combination module combines the facial feature images, which correspond to various features and are retrieved by the montage DB search module, thereby making a montage.

Also, the facial feature recommendation/combination module may recommend features based on the facial feature image DB when a montage is made by combining images. For example, features determined to be related to the features received from the dialogue-processing system 210 may be recommended based on records on previously made montages.

Here, when a facial feature image suitable for the feature received from the dialogue-processing system 210 is not present in the montage data system 230, a new facial feature generation module may generate a new facial feature image suitable for the feature.

For example, facial feature images corresponding to various features may be generated by applying Generative Adversarial Network (GAN) technology to the montage data system 230. Here, the newly generated facial feature images may be managed by the montage data system 230, and may be retrieved by tagging the same with metadata.

The montage data system 230 may manage a facial feature image DB containing facial feature images, and may serve to tag the facial feature images stored in the facial feature image DB with metadata.

For example, the montage data system 230 creates metadata through analysis of existing facial feature images stored in the facial feature image DB and tags the images with the metadata. Also, whenever a facial feature image is added, the montage data system 230 creates metadata thereon and tags the facial feature image with the metadata, thereby updating the facial feature image DB.

Here, a metadata creation module may analyze 2D or 3D images stored in the facial feature image DB and create metadata based on a predefined system.

Here, a metadata tag module may define an information management system such that a facial feature image corresponding to each feature can be retrieved based on a dialogue, and may support the metadata creation module by tagging the facial feature image with metadata.

Here, the facial feature image DB may store and manage facial feature images corresponding to various features.

The shared display system 240 provides space that can be shared between at least one inquirer and at least one respondent, and may support interaction between the participants who participate in making of a montage.

Here, a montage representation module may receive a montage from the montage making system 220 and display the same to at least one inquirer and at least one respondent.

Figure 3:
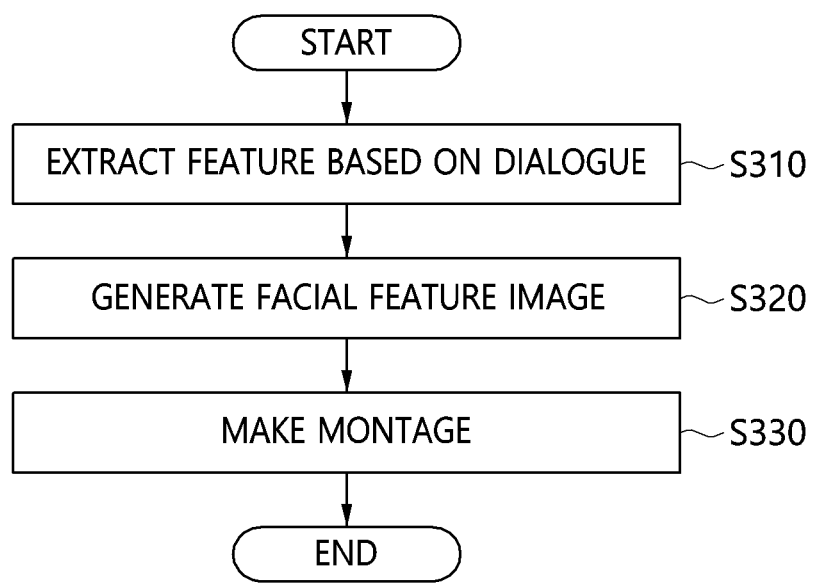
FIG. 3 is a flowchart illustrating a method for making a montage based on a dialogue according to an embodiment of the present invention.

FIG. 3 is a flowchart illustrating a method for making a montage based on a dialogue according to an embodiment of the present invention.

Referring to FIG. 3, in the method for making a montage based on a dialogue according to an embodiment of the present invention, a feature for making a montage is extracted based on the dialogue between at least one inquirer and at least one respondent at step S310.

Here, a montage in the present invention indicates a facial composite that is virtually made by combining the characteristics of a criminal or a suspect according to descriptions by witnesses or victims, and may be made by combining the characteristics of the respective components representing a face, including a hair style or accessories applied to the facial area.

Accordingly, a feature in the present invention may be characteristic information of each of facial components that constitute a montage. For example, not only components related to a face including hair, such as a face shape, a hair style, eyes, a nose, a mouth, and ears, but also components that can affect representation of a face, such as sex or an age group, may be included.

Here, a keyword corresponding to a feature is extracted by analyzing the answer provided by at least one respondent grasping the purport of a question asked by at least one inquirer, and the keyword may be taken as metadata.

For example, assuming that an inquirer asks, "What did the hair style look like?", the answer provided by a respondent is analyzed, whereby a keyword related to 'hair style' may be extracted. If the respondent says "long straight hair", keywords such as 'long', 'straight hair', and the like are extracted and taken as metadata, whereby features may be extracted. That is, metadata, such as 'hair style={long, straight}', is created from the keywords, whereby a feature corresponding to 'long straight hair' may be extracted.

Also, although not illustrated in FIG. 3, in the method for making a montage based on a dialogue according to an embodiment of the present invention, it is determined based on the dialogue whether there are missing features, and additional questions may be generated in order to get additional features when it is determined that there are missing features.

For example, when a feature related to eyes is not extracted because content about 'eyes' is not covered by the dialogue, an additional question for asking about the shape of the 'eyes', such as "what do the eyes look like?", is generated and provided to the inquirer such that an additional feature is got based thereon.

Hereinafter, the process of extracting a feature and the process of getting an additional feature using an additional question will be described in more detail with reference to FIGS. 4 to 5.

Figure 4:
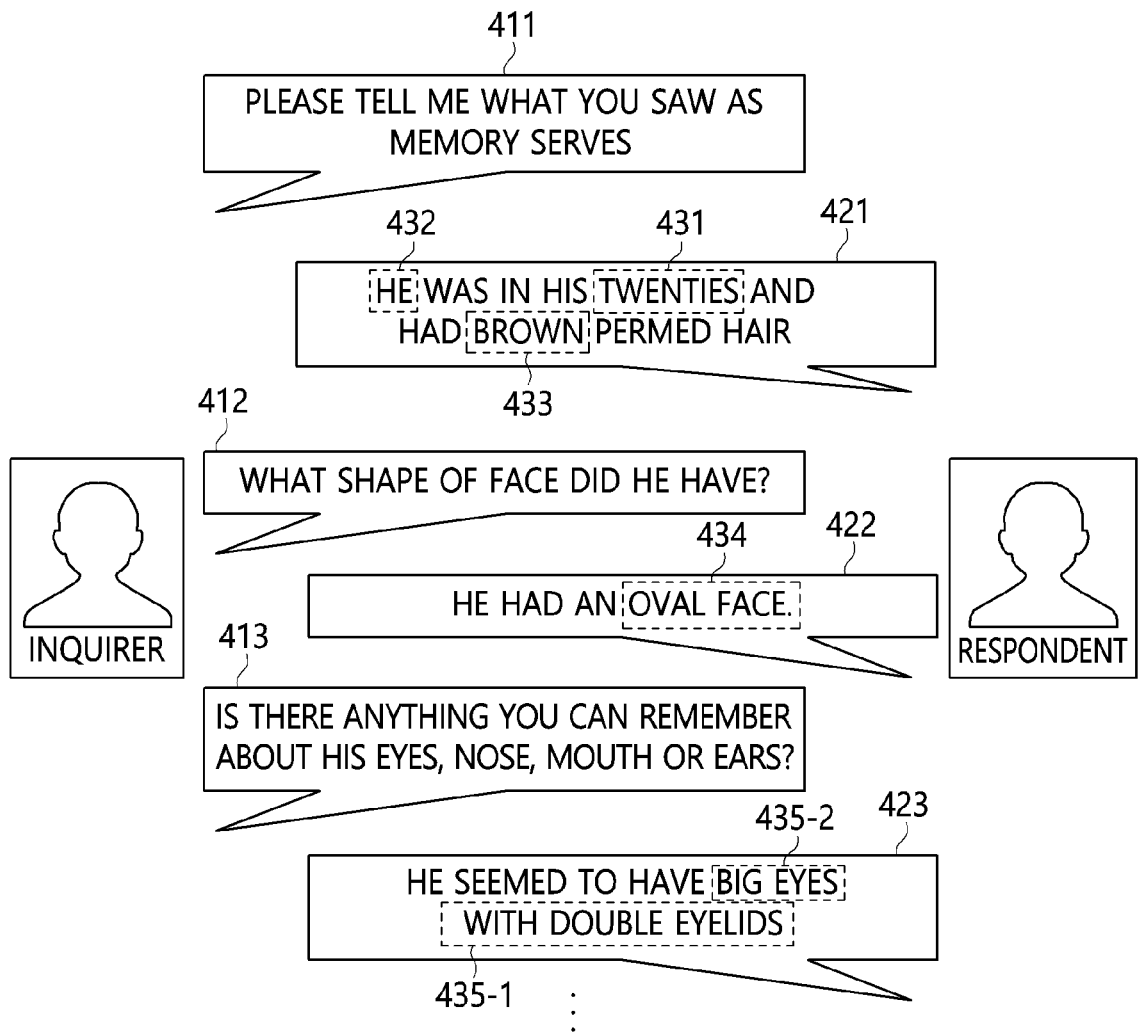

First, referring to FIG. 4, a dialogue between an inquirer and a respondent may be checked.

Here, the apparatus for making a montage according to an embodiment of the present invention may analyze the phrase 421, which is "A man in his twenties, and he had brown permed hair", as the answer provided by the respondent in response to the sentence 411, "Please tell me everything you saw as memory serves.", spoken by the inquirer.

Here, when the sentence 411 spoken by the inquirer is analyzed, it is expected that keywords related to various kinds of features will be extracted from the answer provided by the respondent. Accordingly, the apparatus for making a montage may extract keywords 431, 432 and 433, such as 'twenties', 'man', 'brown permed hair', and the like, which are determined to be related to making of a montage, from the phrase 421, and take the same as metadata.

Using the metadata created as described above, features such as those illustrated in FIG. 5 may be extracted.

Then, the apparatus for making a montage generates additional questions 412 and 413 illustrated in FIG. 4, such as "what shape of face did he have?", "Is there anything you can remember about his eyes, nose, mouth or ears?", and the like, and provides the same to the inquirer in order to get additional features required for making of a montage.

As described above, the inquirer is induced to ask the respondent the additional questions 412 and 413, whereby keywords 434, 435-1 and 435-2 may be extracted from the answer by the respondent in order to get additional features.

Here, the additional questions illustrated in FIG. 4 are not limited to a specific format, but may be generated in any of various formats so as to have content suitable for eliciting a dialogue about lacking features from the respondent.

Also, in the method for making a montage based on a dialogue according to an embodiment of the present invention, a montage is made based on the features at step S320.

Here, the facial feature images may represent facial components corresponding to the features. For example, when a feature is 'big eyes with double eyelids', a facial feature image may be an image matching 'big eyes with double eyelids'.

Here, facial feature images may be retrieved from the facial feature image DB in consideration of metadata on the features.

Also, although not illustrated in FIG. 3, in the method for making a montage based on a dialogue according to an embodiment of the present invention, metadata is created by analyzing the characteristics of each of multiple 2D or 3D facial feature images, and each of the multiple facial feature images is tagged with metadata corresponding thereto, whereby a facial feature image DB may be configured.

That is, because the facial feature image DB stores multiple facial feature images tagged with metadata corresponding thereto, metadata corresponding to a feature and a facial feature image tagged with the metadata may be retrieved and used.

For example, when metadata corresponding to a feature is 'a sharp nose', a facial feature image tagged with 'a sharp nose' may be retrieved from the facial feature image DB and then used.

Here, when a facial feature image tagged with the corresponding metadata is not present in the facial feature image DB, a new facial feature image corresponding to the feature may be generated.

For example, metadata corresponding to a feature is 'red curls', but a facial feature image tagged with 'red curls' may not be present in the facial feature image DB. In this case, a facial feature image corresponding to 'red curls' may be newly generated.

Here, a new facial feature image may be generated by applying a Generative Adversarial Network (GAN) to the facial feature image DB.

Here, the new facial feature image may be tagged with metadata and then stored in the facial feature image DB.

For example, when multiple facial feature images stored in the facial feature image DB are input to a Generative Adversarial Network (GAN), a new facial feature image that is different from the multiple facial feature images may be generated based on the result of training performed using the multiple facial feature images. Then, metadata on the new facial feature image is generated using a system predefined for tagging with metadata, and the new facial feature image may be managed by tagging the same with the metadata.

Through the above-described process, the facial feature images of the features required for making a montage based on a dialogue may be managed so as to be capable of being retrieved.

Also, in the method for making a montage based on a dialogue according to an embodiment of the present invention, a montage is made based on the facial feature images at step S330.

Here, a montage may be made by combining the multiple facial feature images generated based on the multiple features.

For example, if the features are extracted as illustrated in FIG. 5, facial feature images corresponding to the respective features are combined, whereby a montage corresponding to 'a man in his twenties having an oval face, brown permed hair, and big eyes with double eyelids' may be made.

Here, the multiple facial feature images may be variously combined depending on the features and additional features got based on the dialogue between an inquirer and a respondent.

For example, a montage may be made by combining facial feature images representing a face shape, eyes, a nose, and a mouth, or may be made by combining facial feature images representing a hair style, eyes, a nose, a mouth, and a skin color.

Also, although not illustrated in FIG. 3, in the method for making a montage based on a dialogue according to an embodiment of the present invention, the montage may be displayed on a display shared between the at least one inquirer and the at least one respondent.

Figure 6:
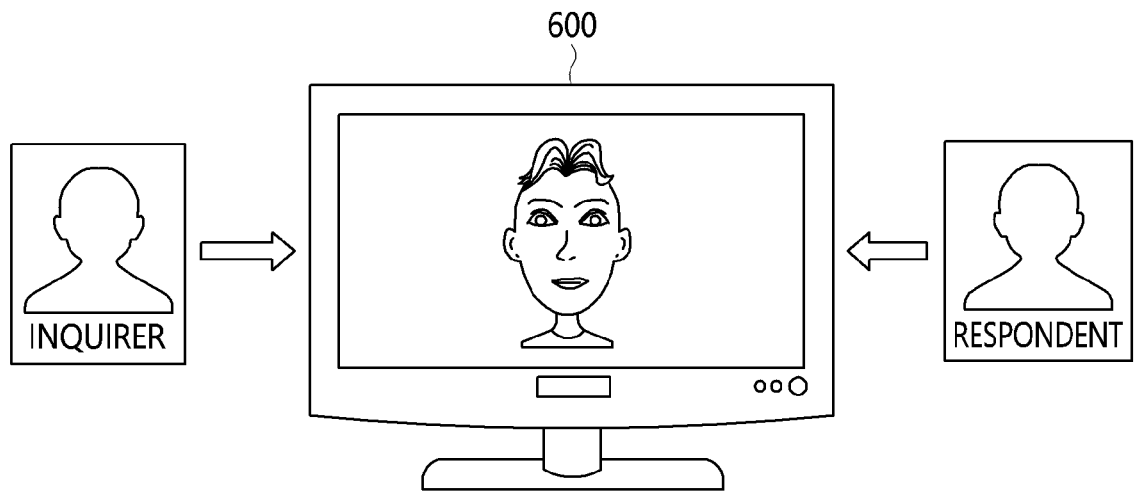
FIGS. 6 to 7 are views illustrating an example of a display according to the present invention.

For example, as illustrated in FIG. 6, the made montage may be shown through the display 600, which can be shared between the inquirer and the respondent. That is, according to the present invention, the respondent is able to participate in the process of making a montage in real time, whereby a more accurate montage may be made.

Here, a recommended montage for the montage may also be displayed. That is, because various facial feature images may be retrieved even for the same feature, a recommended montage may be provided in order to incorporate various facial feature images.

Figure 7:
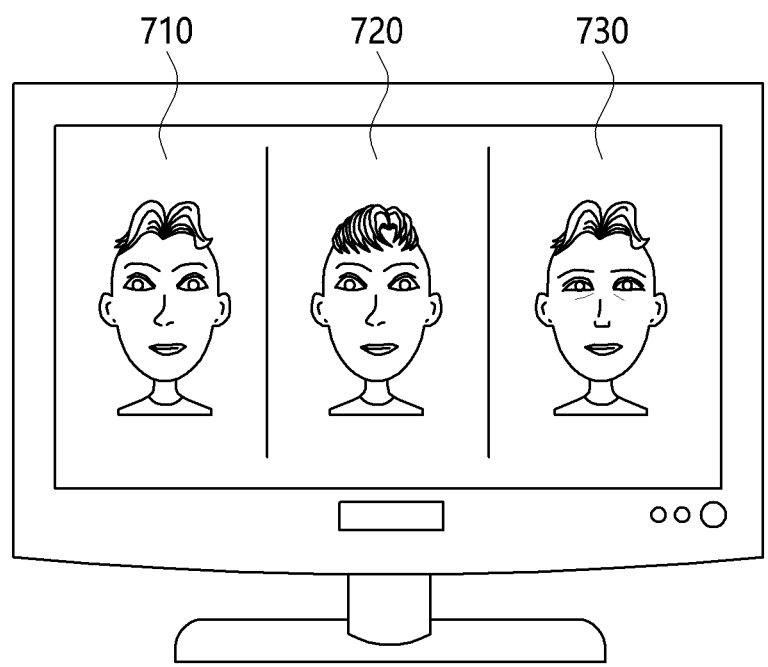

For example, when a feature extracted based on a dialogue is 'curls', facial feature images representing various kinds of curls may be retrieved. That is, as illustrated in FIG. 7, a single reference montage 710 and a recommended montage 720, in which only the style of curls is changed compared to the reference montage 710, may be provided together.

In another example, when a feature is 'eyes with double eyelids', a recommended montage 730 including eyes that look different despite also having double eyelids may be provided.

In another example, when there is a feature that is not extracted because the respondent has no memory thereabout, a facial feature image corresponding thereto is recommended based on data that was previously used to make a montage, whereby a recommended montage may be made.

Through the above-described method for making a montage based on a dialogue, a natural dialogue between an inquirer who intends to make a montage and a respondent, such as a witness, a victim, or the like, is analyzed, whereby a montage may be automatically made.

Also, additional questions required for making of a montage are recommended to an inquirer such that the inquirer easily elicits the memories of witnesses or victims, whereby a greater amount of information may be collected and a desired montage may be made more accurately based on the collected information.

Figure 8:
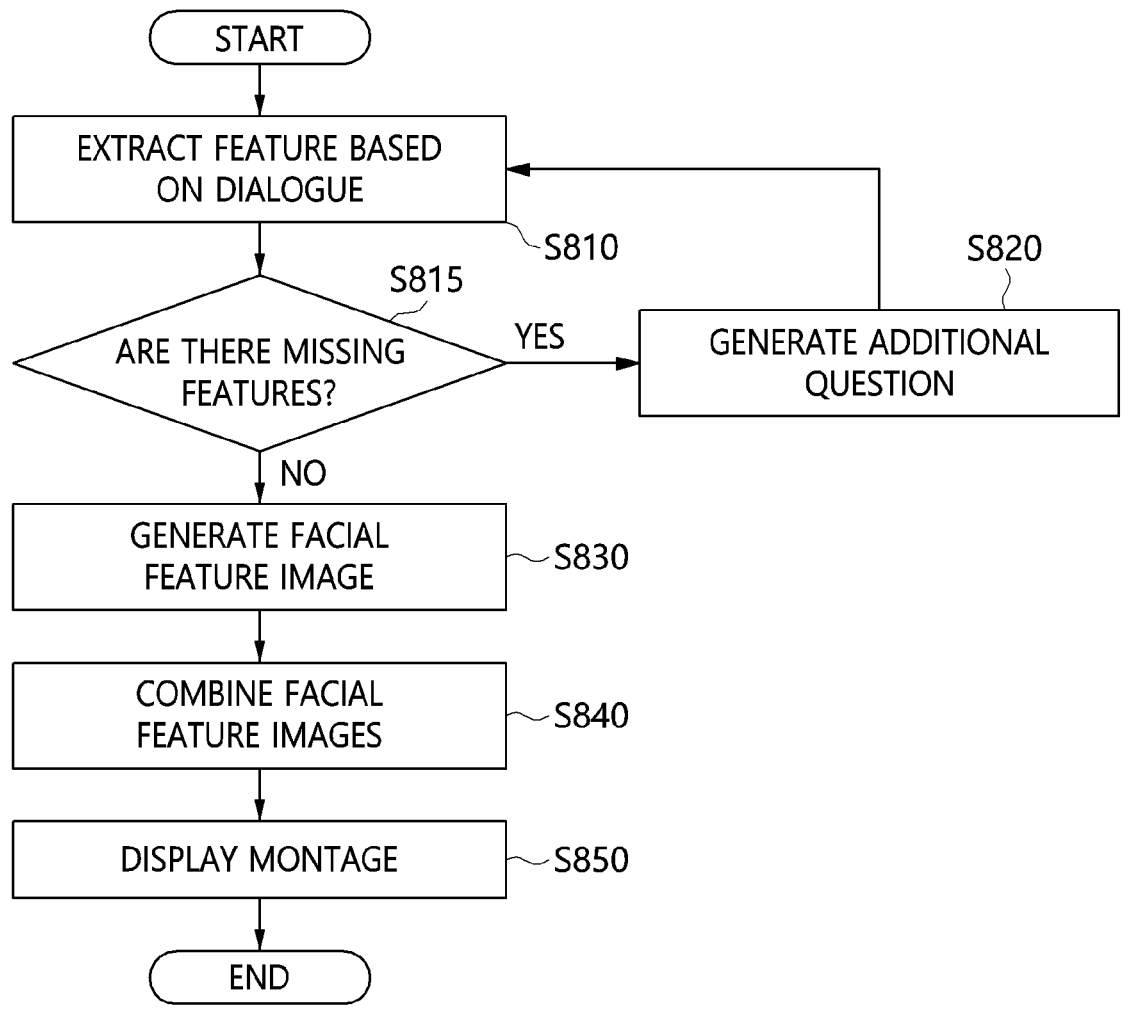
FIG. 8 is a flowchart illustrating in detail a method for making a montage based on a dialogue according to an embodiment of the present invention.

FIG. 8 is a flowchart illustrating in detail a method for making a montage based on a dialogue according to an embodiment of the present invention.

Referring to FIG. 8, in the method for making a montage based on a dialogue according to an embodiment of the present invention, first, features for making a montage may be made based on the dialogue between at least one inquirer and at least one respondent at step S810.

Subsequently, whether there are missing features is determined at step S815 based on the dialogue, and when it is determined that there are missing features, additional questions for getting additional features may be generated at step S820.

Here, the generated additional questions are provided to the at least one inquirer such that the inquirer is able to elicit a dialogue related to the additional features.

Also, when it is determined at step S815 that there are no missing features, a montage may be made at step S830.

Here, facial feature images may be retrieved from the facial feature image DB in consideration of metadata corresponding to the features.

Here, when a facial feature image tagged with the metadata is not present in the facial feature image DB, a new facial feature image corresponding to the feature may be generated.

Subsequently, a montage is made by combining the multiple facial feature images generated based on the multiple features at step S840, and the made montage may be displayed on a display shared between the at least one inquirer and the at least one respondent at step S850.

Figure 9:
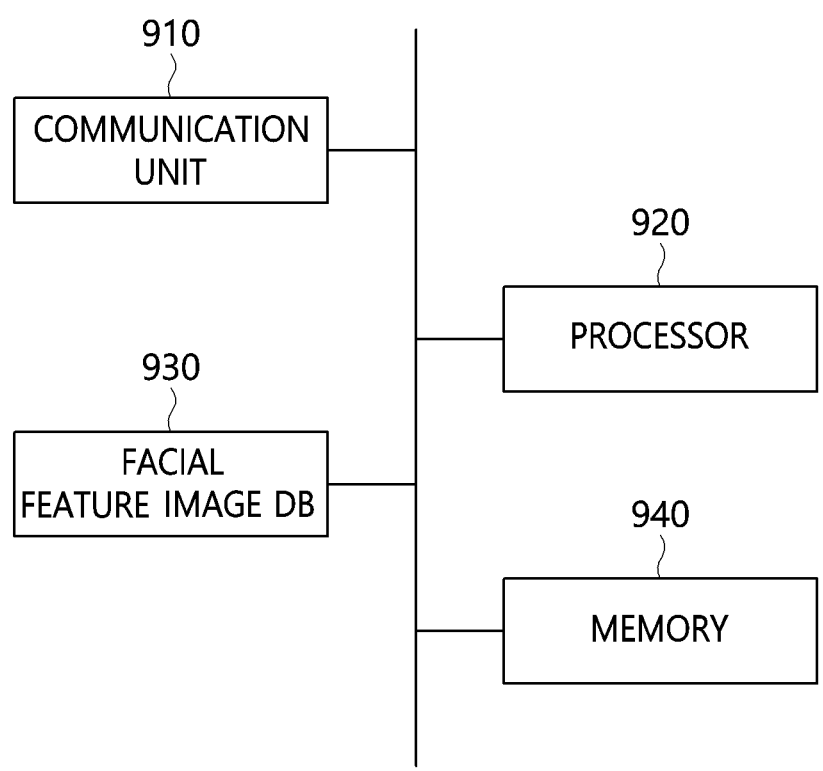
FIG. 9 is a block diagram illustrating an apparatus for making a montage based on a dialogue according to an embodiment of the present invention.

FIG. 9 is a block diagram illustrating an apparatus for making a montage based on a dialogue according to an embodiment of the present invention.

Referring to FIG. 9, the apparatus for making a montage based on a dialogue according to an embodiment of the present invention includes a communication unit 910, a processor 920, a facial feature image DB 930, and memory 940.

The communication unit 910 may serve to transmit and receive information required for making a montage through a communication network. Here, the network provides a path via which data is delivered between devices, and may be conceptually understood to encompass networks that are currently being used and networks that have yet to be developed.

For example, the network may be an IP network, which provides service for transmission and reception of a large amount of data and a seamless data service through an Internet Protocol (IP), an all-IP network, which is an IP network structure that integrates different networks based on IP, or the like, and may be configured as a combination of one or more of a wired network, a Wireless Broadband (WiBro) network, a 3G mobile communication network including WCDMA, a 3.5G mobile communication network including a High-Speed Downlink Packet Access (HSDPA) network and an LTE network, a 4G mobile communication network including LTE advanced, a satellite communication network, and a Wi-Fi network.

Also, the network may be any one of a wired/wireless local area communication network for providing communication between various kinds of data devices in a limited area, a mobile communication network for providing communication between mobile devices or between a mobile device and the outside thereof, a satellite communication network for providing communication between earth stations using a satellite, and a wired/wireless communication network, or may be a combination of two or more selected therefrom. Meanwhile, the transmission protocol standard for the network is not limited to existing transmission protocol standards, but may include all transmission protocol standards to be developed in the future.

The processor 920 extracts features for making a montage based on the dialogue between at least one inquirer and at least one respondent.

Here, keywords corresponding to the features are extracted by analyzing answers provided by the at least one respondent grasping the purport of the question asked by the at least one inquirer, and the keywords may be taken as metadata.

Also, the processor 920 determines whether there are missing features based on the dialogue, and when it determines that there are missing features, the processor 920 generates additional questions for getting additional features.

Also, the processor 920 generates facial feature images based on the features.

Here, facial feature images may be retrieved from the facial feature image DB 930 in consideration of metadata corresponding to the features.

Here, the facial feature image DB 930 may be configured by tagging each of multiple 2D or 3D facial feature images with metadata that is created by analyzing the characteristics of the corresponding facial feature image.

Here, when a facial feature image tagged with the metadata is not present in the facial feature image DB 930, a new facial feature image corresponding to the feature may be generated.

Here, a new facial feature image may be generated by applying a Generative Adversarial Network (GAN) to the facial feature image DB 930.

Here, the new facial feature image may be tagged with metadata and stored in the facial feature image DB 930.

Also, the processor 920 makes a montage based on the facial feature images.

Here, the montage may be made by combining the multiple facial feature images generated based on the multiple features.

Also, the processor 920 displays the montage on a display shared between the at least one inquirer and the at least one respondent.

Here, at least one recommended montage may be displayed as well as the montage.

The facial feature image DB 930 manages facial feature images.

The memory 940 stores various kinds of information generated in the above-described apparatus for making a montage according to an embodiment of the present invention.

According to an embodiment, the memory 940 may be separate from the apparatus for making a montage, and may support the function for making a montage. Here, the memory 940 may operate as separate mass storage, and may include a control function for performing operations.

Meanwhile, the apparatus for making a montage includes memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard-disk device, an optical disk device, or any other kind of mass storage device.

Using the above-described apparatus for making a montage based on a dialogue, information based on which a montage is capable of being made is extracted from a natural dialogue between multiple participants, whereby a montage may be recommended, combined, and made.

Also, witnesses or victims who provide information required for making of a montage may be easily induced to remember their memories, and an environment in which they are able to participate in making of a montage is provided, whereby a more accurate montage may be made.

Also, a montage may be made using a generalized method without professional specialists.

Figure 10:
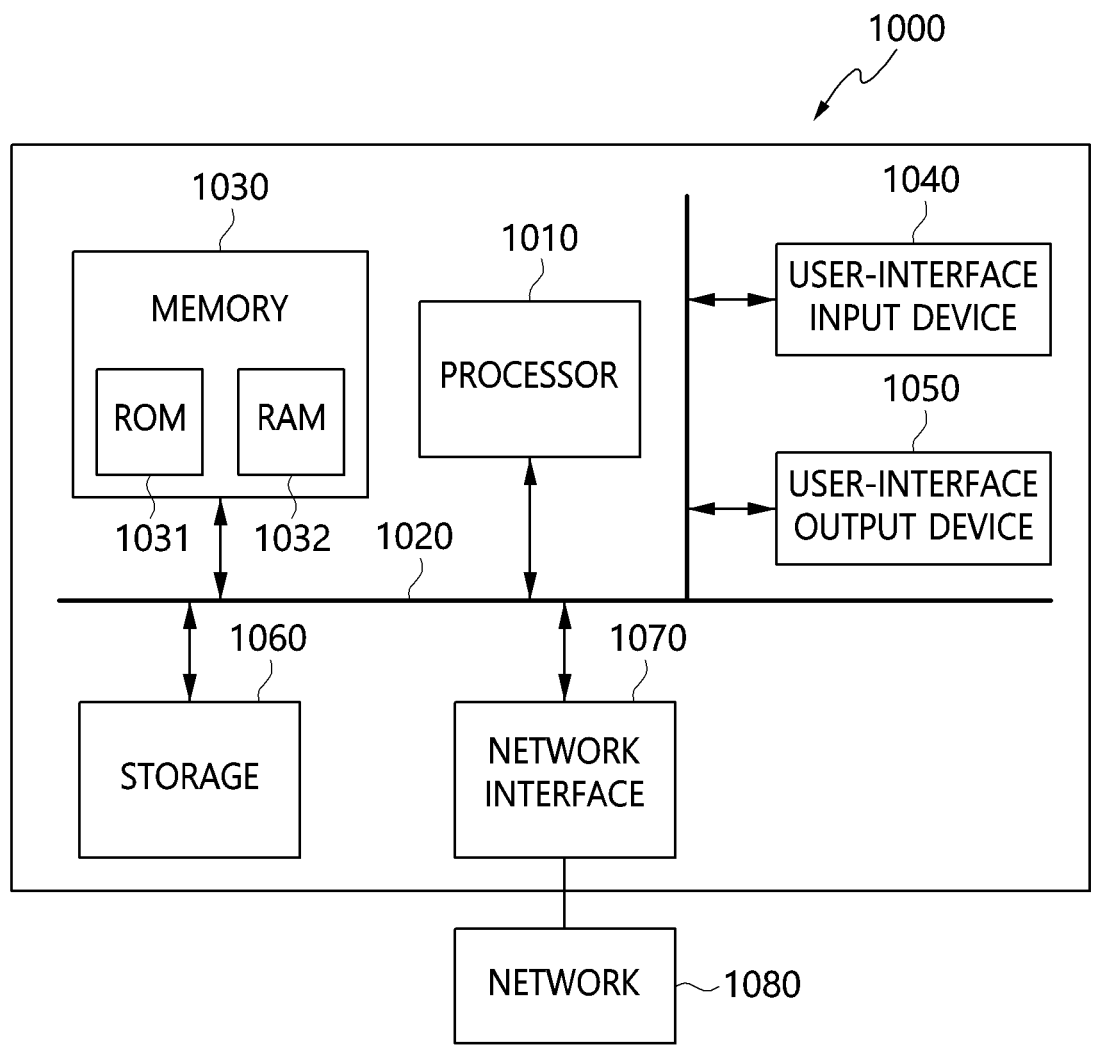
FIG. 10 is a view illustrating a computer system according to an embodiment of the present invention.

FIG. 10 is a view illustrating a computer system according to an embodiment of the present invention.

Referring to FIG. 10, an embodiment of the present invention may be implemented in a computer system including a computer-readable recording medium. As illustrated in FIG. 10, the computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing processing instructions stored in the memory 1030 or the storage 1060. The memory 1030 and the storage 1060 may be any of various types of volatile or nonvolatile storage media. For example, the memory may include ROM 1031 or RAM 1032.

Accordingly, an embodiment of the present invention may be implemented as a non-transitory computer-readable storage medium in which methods implemented using a computer or instructions executable in a computer are recorded. When the computer-readable instructions are executed by a processor, the computer-readable instructions may perform a method according to at least one aspect of the present invention.

According to the present invention, a montage may be automatically made by analyzing a natural dialogue between an inquirer who intends to make a montage and respondents, such as witnesses, victims, or the like.

Also, the present invention recommends additional questions required for making a montage to an inquirer so as to induce witnesses or victims to easily refresh their memories, thereby collecting a greater amount of information and more accurately making a desired montage based on the collected information.

Also, the present invention provides a montage making environment in which multiple participants are able to interact with each other using shared resources, thereby enabling witnesses or victims to participate in making of a montage.

Also, the present invention may provide a montage making system that is capable of automatically recommending or adding new feature data, which is continuously required with internationalization and diversification of society.

Also, the present invention enables a montage to be made using a method that is more generalized than a method in which a montage is made by professional specialists.

As described above, the method for making a montage based on a dialogue and the apparatus using the method according to the present invention are not limitedly applied to the configurations and operations of the above-described embodiments, but all or some of the embodiments may be selectively combined and configured, so that the embodiments may be modified in various ways.

What is claimed is:

1. A method for making a montage based on a dialogue, comprising:
   extracting a feature for making a montage based on a dialogue between at least one inquirer and at least one respondent;
   generating a facial feature image based on the feature; and
   making a montage based on the facial feature image;
   wherein generating the facial feature image comprises:
   retrieving the facial feature image from a facial feature image database in consideration of metadata corresponding to the feature;
   generating a new facial feature image corresponding to the feature when a facial feature image tagged with the metadata is not present in the facial feature image database; and
   displaying the montage on a display shared between the at least one inquirer and the at least one respondent; and
   wherein generating the new facial feature image comprises generating the new facial feature image by applying a Generative Adversarial Network (GAN) to the facial feature image database.

2. The method of claim 1, further comprising:
   determining whether there are missing features based on the dialogue; and
   generating an additional question for getting an additional feature when it is determined that there are missing features.

3. The method of claim 2, wherein the montage is made by combining multiple facial feature images generated based on multiple features.

4. The method of claim 1, wherein extracting the feature comprises extracting a keyword corresponding to the feature by analyzing an answer provided by the at least one respondent, corresponding to a purport of a question asked by the at least one inquirer, and taking the keyword as metadata.

5. The method of claim 1, wherein generating the new facial feature image comprises tagging the new facial feature image with the metadata and storing the new facial feature image tagged with the metadata in the facial feature image database.

6. The method of claim 1, further comprising:
   creating metadata by analyzing characteristics of each of multiple 2D or 3D facial feature images; and
   configuring the facial feature image database by tagging each of the multiple facial feature images with metadata corresponding thereto.

7. The method of claim 1, wherein the feature corresponds to characteristic information of each of facial components constituting the montage.

8. The method of claim 1, wherein displaying the montage comprises displaying at least one recommended montage as well as the montage.

9. An apparatus for making a montage based on a dialogue, comprising:
   a processor for extracting a feature for making a montage based on a dialogue between at least one inquirer and at least one respondent, generating a facial feature image based on the feature, and making a montage based on the facial feature image; and
   a facial feature image database for managing the facial feature image;
   wherein
   the processor retrieves the facial feature image from the facial feature image database in consideration of metadata corresponding to the feature, and when a facial feature image tagged with the metadata is not present in the facial feature image database, the processor generates a new facial feature image corresponding to the feature;

the processor displays the montage on a display shared between the at least one inquirer and the at least one respondent; and the processor generates the new facial feature image by applying a Generative Adversarial Network (GAN) to the facial feature image database.

10. The apparatus of claim 9, wherein the processor determines whether there are missing features based on the dialogue, and generates an additional question for getting an additional feature when it is determined that there are missing features.

11. The apparatus of claim 9, wherein the montage is made by combining multiple facial feature images generated based on multiple features.

12. The apparatus of claim 9, wherein the processor extracts a keyword corresponding to the feature by analyzing an answer provided by the at least one respondent, corresponding to a purport of a question asked by the at least one inquirer, and takes the keyword as metadata.

13. The apparatus of claim 9, wherein the processor tags the new facial feature image with the metadata and stores the new facial feature image tagged with the metadata in the facial feature image database.

14. The apparatus of claim 9, wherein the facial feature image database is configured by tagging each of multiple 2D or 3D facial feature images with metadata created by analyzing characteristics of the facial feature image.

* * * * *